F. WEISS.
RIM TOOL.
APPLICATION FILED OCT. 27, 1920.

1,387,526.

Patented Aug. 16, 1921.

INVENTOR
Fred Weiss
BY
Adam E. Fisher
ATTORNEY

UNITED STATES PATENT OFFICE.

FRED WEISS, OF WOODSTOCK, ILLINOIS.

RIM-TOOL.

1,387,526.   Specification of Letters Patent.   Patented Aug. 16, 1921.

Application filed October 27, 1920. Serial No. 419,791.

*To all whom it may concern:*

Be it known that I, FRED WEISS, a citizen of the United States, residing in the city of Woodstock, county of McHenry, and State of Illinois, have invented new and useful Improvements in Rim-Tools, of which the following is a specification, reference being had to the accompanying drawings.

This invention pertains to rim tools for putting wheel rims carrying their tires, onto the wheel body. The object is to provide a simple, efficient and durable tool of this kind, the use of which will facilitate the mounting of such rims on the wheel.

In the drawings—

Figure 1:
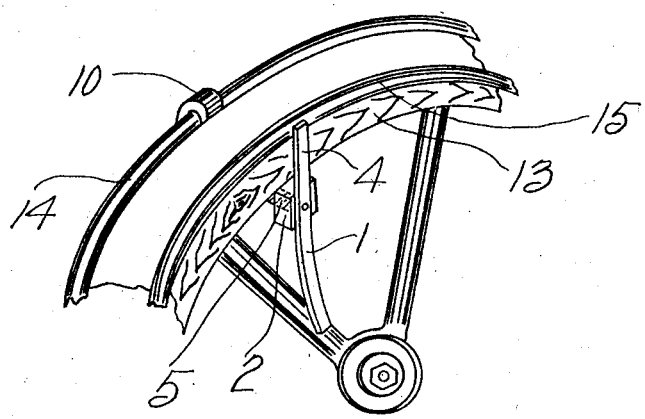
Figure 1 is a perspective view showing the device as in use.
Figure 2:
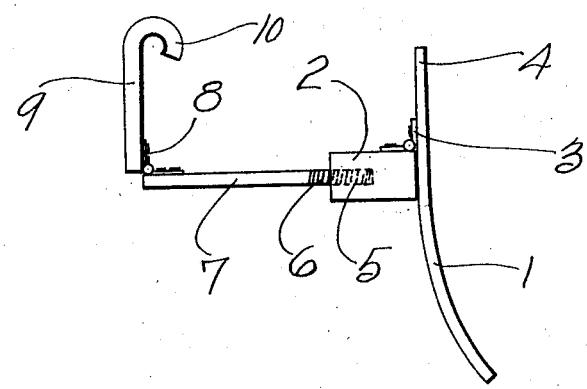
Fig. 2 is a side view of the tool.

The invention consists of a main lever handle 1, preferably curved outwardly, and hingedly mounted on the lug 2 by means of the hinge joint 3, which serves also as a fulcrum for the lever 1. The end 4 of the lever 1 is extended past the fulcrum hinge 3 an appreciable distance for a purpose which will appear. A threaded bore 5 is formed in the lug 2 at right angles to the lever handle 1 adapted to engage the threaded end 6 of the rod 7. To the outer end of the rod 7 is hingedly connected by means of the hinge joint 8, a shorter hook rod 9 which ends in an inwardly turned hook 10.

In operation, the hook 10 is hooked over the inner flange 11 of the wheel proper 12 and the rod 7 is passed beneath the wheel base 13 between the spokes. One portion 14 of the rim being then placed in position on the wheel base, the opposite and outstanding portion 15 of the rim is then grasped by the end 4 of the lever handle 1, and by pulling out on this lever handle, the rim is forced on. As the work progresses the lever handle 1 may be readily moved up closer to the rim by merely turning the lug 2 upon the threaded end 6.

While I have herein described a certain specific manner and method of constructing and assembling the elements of my invention, it is understood that I may vary from the same in minor details, not departing from the spirit of my invention, so as best to construct a practical device for the purpose intended, as defined in the appended claim.

What I claim to be new and patentable is:

A rim tool for wheels, comprising a lever handle; a lug hinged to the lever handle at a point spaced from the end thereof; a threaded bore in the lug perpendicular to the lever handle; a threaded rod to engage the threaded bore of the lug; a short hook rod hinged to the free end of the threaded rod; and an inwardly turned hook on the free end of the hook rod.

FRED WEISS.

Witnesses:
HARRY H. SCHROEDER,
MELVIN K. HAUSMANN.